United States Patent

[11] 3,617,134

[72] Inventors Donald Irwin Frush
Los Gatos;
Albert Daniel Rizzi, San Jose, both of Calif.
[21] Appl. No. 59,409
[22] Filed July 30, 1970
[45] Patented Nov. 2, 1971
[73] Assignee International Business Machines Corporation
Armonk, N.Y.

[54] OPTICAL IMAGE FRAME COORDINATE DATA DETERMINING SYSTEM
10 Claims, 4 Drawing Figs.

[52] U.S. Cl. .................................................. 356/162,
235/61.6 A, 352/236, 353/120, 356/166, 356/170, 250/237
[51] Int. Cl. ................................................ G01g 11/00
[50] Field of Search ........................................... 356/162,
164, 166, 170, 171; 250/219 R, 237 QA; 285/61.6 A; 352/92, 236; 353/120

[56] References Cited
UNITED STATES PATENTS

| | | | |
|---|---|---|---|
| 2,339,204 | 1/1944 | Stockbarger et al. ......... | 250/237 |
| 2,563,892 | 8/1951 | Waller et al. ................. | 352/92 |
| 2,968,793 | 1/1961 | Bellamy ......................... | 250/219 |
| 3,113,989 | 12/1963 | Gray et al. ..................... | 250/219 |
| 3,259,733 | 7/1966 | Klaver et al. .................. | 235/61.6 A |
| 3,330,964 | 7/1967 | Hobrough et al. ............. | 250/237 |
| 3,410,956 | 11/1968 | Grossimon et al. ........... | 250/237 |
| 3,490,840 | 1/1970 | Eagle ............................. | 353/120 |
| 3,515,888 | 6/1970 | Lewis ............................. | 250/237 |
| 3,544,207 | 12/1970 | John, Jr. ........................ | 352/92 |
| 3,549,254 | 12/1970 | Muir ............................... | 356/172 |

Primary Examiner—Ronald L. Wibert
Assistant Examiner—J. Rothenberg
Attorneys—Hanifin and Jancin and George E. Roush ABSTRACT: The use of film projection and like optical display devices in conjunction with digital computer and data-processing systems is enhanced by a rectangular, or X-Y, coordinate determining system providing a completely unobstructed view of the display by means of a mask element moved across the film frame bearing the information virtually in the plane of the frame. A pair of photoresponsive elements are arranged in the display device for receiving light from a pair of light-transmitting spots correspondingly arranged parallel to an edge of each film frame. The mask element is shaped to interrupt the light passing between the spots and the photoresponsive cells and a photosensitive probe placed on the display at a point at which the data coordinates are to be determined. The mask element has one portion interrupting the light periodically for advancing X- and Y-counter as the mask element is moved across the frame up to the probe under control of circuitry comprising conventional electronic gating circuits and latches. Cartesian coordinates are derived directly from the X- and Y-coordinate data counters.

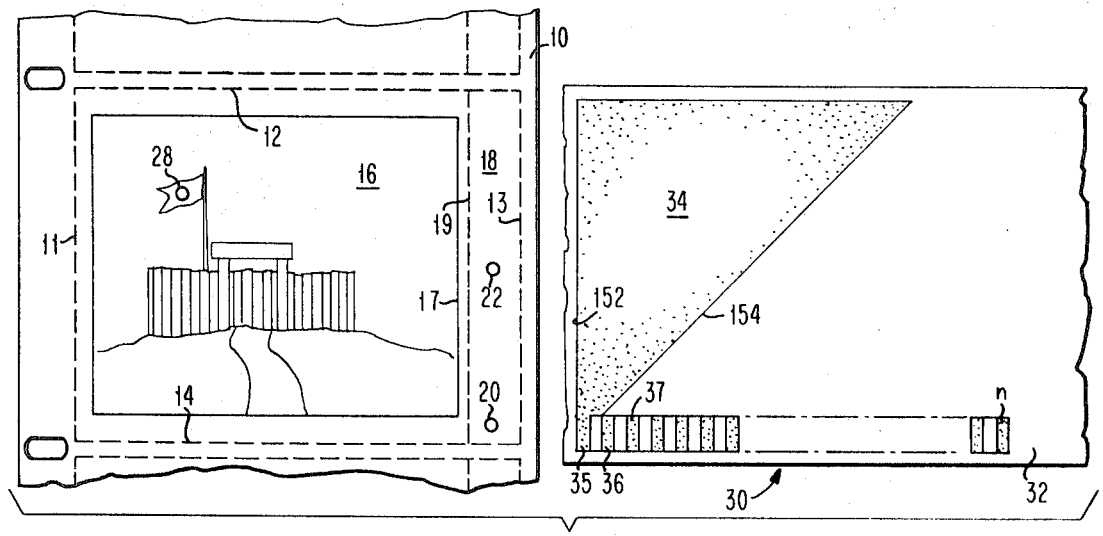
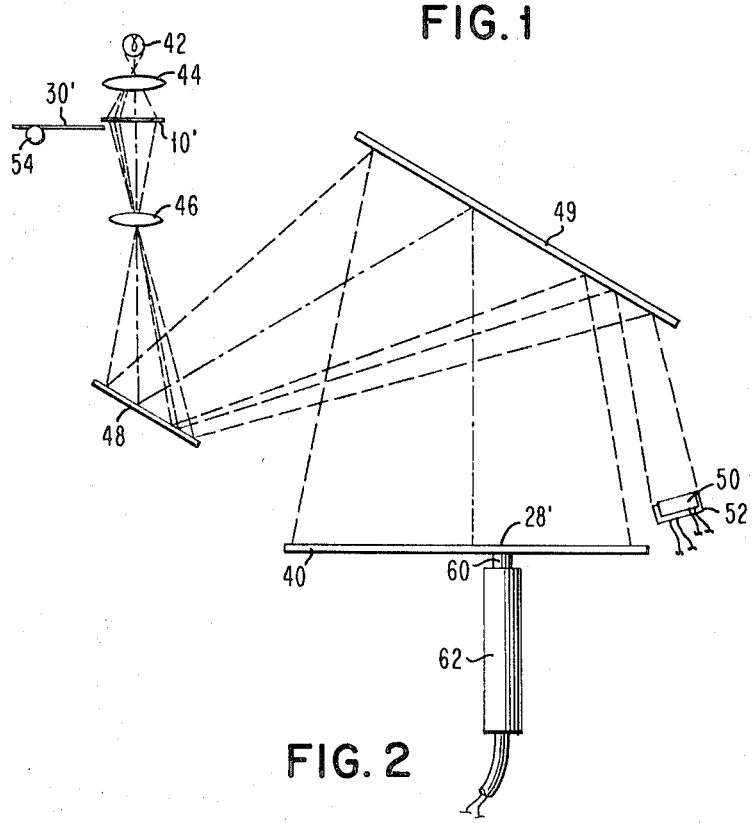
FIG. 1
FIG. 2
INVENTORS
DONALD I. FRUSH
ALBERT D. RIZZI
BY George E. Roush
ATTORNEY 3,617,134

OPTICAL IMAGE FRAME COORDINATE DATA DETERMINING SYSTEM

The invention evolves from the same general field of the graphical display coordinate data determining art as that disclosed in the copending U.S. Pat. Applications Ser. No. 787,421 of Richard Dean Wier filed on the 27th day of Dec., 1968 for "Coordinate Data Determination System" and Ser. No. 47,397 of John Stuart Moffitt filed on the 18th day of June, 1970 for "Acoustic Coordinate Data Determination System," both assigned to the International Business Machines Corporation. Reference to these U.S. Pat. Applications will be helpful in the understanding of the background of this invention.

The invention relates to photographic film frame and like optical-projecting-type graphic displays used in conjunction with electronic computing and data processing systems, and it particularly pertains to the determination of Cartesian coordinates of random loci of points within a predetermined planar area for use with digital systems.

In the contemporary information-handling art, attention is being directed to the use of graphic displays for exhibiting a large quantity of information in readily assimilated form for use in teaching and learning, engineering and technical designing, vehicular traffic detecting and controlling, and weather forecasting, and like applications. The development of this art has reached a level at which it is particularly desirable that data from such a display be reduced readily and reintroduced into an electronic information-handling system, particularly a digital computing and/or data-processing system. Such arrangements are described in the above referenced copending U.S. Pat. applications. Prior art approaches to this problem applied the principle of resistive and conductive grids and plates similar to those used in early telautograph systems. The grids were made either of fine wire or some transparent material which has sufficient conductivity for the purpose. The plates, in most cases, were coatings of transparent but conductive material. Transparent dielectric waveguide structures have been suggested having little discontinuity between the separate waveguides so as to be as little objectionable as possible. All of these arrangements suffer from the principal disadvantage that the optical viewing path is deterred to at least some extent. Nondeterring schemes involve "optical" grids formed by light beams, both in the visible and invisible spectrum, but these schemes are readily disturbed by the interposition of the fingers and like nonprobing elements. All of these systems mentioned required precise registration of a frame of photographic film in an optical projector so that the information is precisely related to the superimposed data-determining system. Present techniques (especially for non-CRT image devices) determine the coordinate location of the probe relative to the viewed target area of the image as viewed on the screen. This requires a close control of all tolerances involved in a projection scheme; otherwise, a large tolerance zone for correct probe position must be tolerated since the effective registration of the image is not included in the response. Some of the following tolerances involved are the location of response point on artwork, location of artwork when shooting master film, mechanical tolerances of locating image in film aperture of projector, magnification tolerance of lens, magnification affect of change in path length of projection system due to mechanical tolerances, wear in sprocket holes in film, stretch or shrink of film length due to temperature or humidity or like condition, differences of adjustment from machine to machine, and tolerances in probe mechanism. Obviously, such systems are more expensive and relatively complex and therefore something less than desirable. Examples of prior art pertinent to film frame and other optical approaches are to be found in the following U.S. Patents:

| | | | |
|---|---|---|---|
| 2,455,532 | 12/1948 | Sunstein | 177-351 |
| 3,125,624 | 3/1964 | Illig et al. | 88-14 |
| 3,434,218 | 3/1969 | Potter | 33-189 |
| 3,455,026 | 7/1969 | Brault | 33-001 | and an article from the technical literature:

W.E. Triest, "Light Pen Tracking System," IBM Technical Disclosure Bulletin, Vol. 7, No. 8, Jan. 1965, p. 692.

According to the invention, the objects indirectly referred to hereinbefore and those which will appear as the disclosure progresses are attained in optical image frame coordinate determination system comprising a projector arrangement having a conventional optical system for projecting an image of a frame of film conventionally except for one or more, preferably a pair of, transparent spots or apertures for radiating light along with the image. A masking element is arranged to move between the spot(s) and corresponding photoresponsive device(s) arranged beyond the film frame to intercept light from the illuminated spot(s). The masking element has a configuration enabling the determination of the distance between the point of interruption of light projected from the film frame and impinging on an optical probe device pressed against the image on the screen and the point of interruption of light from at least one of the spots to the corresponding photoresponsive device. A single spot and a pair of such masks can be arranged to measure horizontal and vertical (X-Y) coordinates individually. Preferably two spots and a single mask are used to measure both X- and Y-coordinates in a single pair. The input coordinates in either case are related directly to the film, which greatly reduces the tolerance problems. This is accomplished by photographing the reference spot(s) on the film and projecting them onto corresponding reference photocell(s). Then X- and Y-coordinates are generated using these spots for reference. In addition to the major advantage of tolerance reduction, advantages are also realized in that coordinate locations generated with this technique are proportional to the size of the image. The coordinate locations generated are relative to reference points on the image frame. The generation of locations is independent of the velocity of the mask (that is, constant velocity is not a requisite). The small physical size of the mask (frame size) allows for a photographic mask to be employed, thus allowing close mask tolerances at a low manufacturing cost. The operation of the probe is checked visually by the physical traverse of the mask as well as audibly by the sound of the mask advance mechanism (lack of feedback is a problem with CRT-type probes). If an insufficiently illuminated target area has been selected, inactivity of the probe is an immediate notification that the probe should be repositioned. X A single mask and two spots afford an accurate arrangement for determining both rectangular coordinates in a single pass. Such an arrangement is also lower in cost and simpler in construction. A laterally translated masking element is basic but a rotational mask element is contemplated for special cases. Conventional electronic logic circuitry is arranged for data entry and control. An up-down counting circuit or two counting circuits arranged to indicate the difference in counts provides greater accuracy for given tolerance of a single mask element system.

FIG. 1 is a schematic diagram of the essential elements of an optical image frame coordinate-determining system according to the invention;

FIG. 2 is a schematic view of an optical projection system adapted for a film frame coordinate data determining elements according to the invention;

Figure 3:
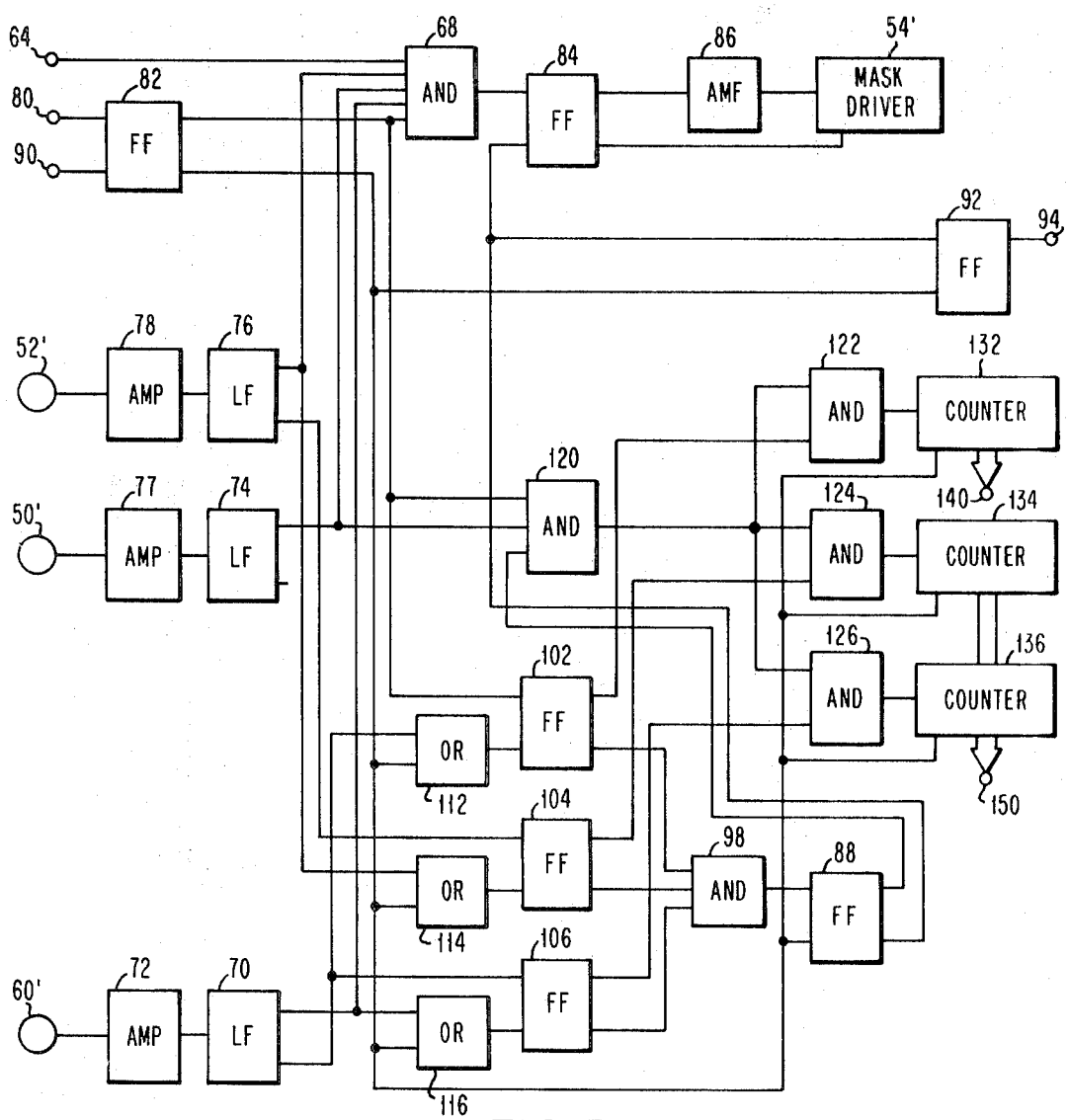
FIG. 3 is a logical circuit diagram of an exemplary embodiment of the invention.

The essential elements of a film frame coordinate data determination system according to the invention are depicted in the schematic diagram of FIG. 1.

A portion of optical imaging material shown here as a section of a moving-picture-type film transparency 10 comprises an optical imaging frame bordered by the dashed lines 11, 12, 13 and 14. The imaging frame is divided into an information-bearing area 16 within a border 17 and an auxiliary image area 18 bounded on the left by a dashed line 19. In many applications of the invention, the area 16 corresponds to the image area of a 16 mm. motion-picture film while the auxiliary image area 18 corresponds to the portion of that film reserved for the audio frequency soundtrack recording. The desired photographic content, convention in all respects, is printed in the area 16. In the area 18, a spot 20 is located below the lower edge of the projected-image border 17. Another spot 22 is located in the auxiliary image area 18, preferably centrally of the area. Conventional addressing information spots are not precluded from placement in the auxiliary area 18 so long as the spots 20 and 22 are not interfered with for coordinate data information determining. One or both of these spots may be used as reference light level spots initially, if desired. These spots, 20 and 22, are used according to the invention to determine the relative location of a point in an area of similar size in the information-bearing image, such as the area 28. This relative location is obtained by means of a masking element 30 shown here as a portion of transparent material 32 having an opaque dimension-determining triangular portion 34 converging into a multiple of opaque bars 35, 36, 37, ..., n which are separated by transparent areas of substantially identical size and configuration as shown. The operative relationship between the film frame 10 and the masking element 30 will be developed hereinafter.

FIG. 2 depicts one example of a projection system forming an optical image frame coordinate data determining system in conjunction with the above-described optical image frame. A rear projection image screen 40 of optically ground glass for example is arranged to display the optical image-bearing information area of an optical image frame 10' in an otherwise conventional image-projector device. The arrangement is more or less conventional and is illustrated schematically by a lamp 42 and condensing lens 44 illuminating the film frame 10', and a focusing lens 46. A pair of mirrors 48 and 49 are necessary only in the interest of compactness. Light from the lamp 42 illuminating the spots 20 and 22 is projected onto a pair of photoresponsive devices, only one, 50, of which is visible; the other, 52, is hidden below it. The effective area of the photosensitive devices 50 and 52 is larger than the spots as projected. This is accomplished by large lenses that are focused on small photocells. The effective area of the photocell must be the size of the projected spots plus the tolerance of the location of the film, that is, the spot is projected on the corresponding photocell under all conditions of misregistration.

At this point it should be understood that, while film transparencies are preferred for the majority of film projection systems and the like to which the invention is applied, it is equally possible that an image frame of optical imaging material may be opaque and lighted from the front and reflected through the focusing lens 46 in the manner of the conventional projection lantern. Such an arrangement is highly practical for engineering design applications in that a working print may be projected, eliminating the necessity for copying on photographic film which can consume days of time. The spots 20 and 22 can be base dimension points on the print and the photoresponsive device may be movable on the screen 40 provided the masking element and the locations conform.

Also the invention is equally applicable to transparent film slides and slide projectors. Alternately, for this application, the light-transmitting spots are holes punched in the slide mounting. It is contemplated that commercially mounted slides can be obtained without any special marking. The slides are prepared in a simple punch mechanism arranged for considerable two dimension movement of the slide with respect to the predetermined punch and die locations. The slides are positioned accurately with respect to the critical information and then the mounting is punched for permanent reference.

In either event, the masking element 30' is suitable mounted for lateral translation by means of a mask-drive 54 across the film frame 10' to interrupt the light being projected. The mask-drive 54 is preferably motor-driven but it can even be moved manually. As will develop, the motion need not be uniform and can even stop and restart since units of distance only are measured, independent of time. This operation will interfere with light projected from the spots 20 and 22 reaching the photoresponsive devices 50 and 52. A photosensitive element 60, conveniently arranged in a probe 62, will detect the relative presence of light at a point 28' on the screen 40. Preferably the spots 20 and 22 are transparent spots in an opaque area 18 of the film frame 10', although it should be understood that the inverse of this relationship is perfectly feasible for determining the location of dark areas in the image as can be the case with engineering design drawings. The inverse arrangement is somewhat inherently fail-safe also. As the masking element 30' is moved across the film frame 10' the opaque area 34 will cut off light to the photoresponsive devices 50 and 52 on which light from the spots 20 and 22 is impinging. The interruption of the light impinging on these photoresponsive devices operates electronic circuitry such as that shown in FIG. 3. In the specific circuit arrangement illustrated in FIG. 3 the mask drive 54' is operable only if a switch in the probe 62 is activated by pressure of the probe against the screen 40 or by other means of activation, for example, manual pressure. Such arrangements are conventional in all respects and therefore the switch is not shown specifically. Closing of this switch places a potential on a probe switch terminal 64 for activating an AND gating circuit 68 if, and only if, the circuit is in condition to operate properly. One condition is that the probe photosensitive device 60' be receiving light from the image and not be located at a dark area. This is assured by coupling the output of a level-triggering flip-flop circuit 70 to the AND gating circuit 68. The output of the probe photosensitive device 60' is first applied to an amplifier 72 for delivering a suitable level to the flip-flop circuit 70 for switching it from one state to the other. Because of the gross inconsistency with which the terminology relating to the many types of "multivibrators" and similar circuits is used, the less frequently but much more consistently used term "reciproconductive circuit" will be used in the interest of clarity as a base for defining the terminology used hereinafter. As employed herein, the term "reciproconductive circuit" is construed to include all dual current flow path element (including vacuum tubes, transistors and other current flow controlling devices) regenerative circuit arrangements in which current alternates in one and then the other of those elements in response to applied triggering levels or pulses. The term "free-running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable reciproconductive circuit" indicates such a circuit in which a single trigger is applied to a single input terminal to trigger the reciproconductive circuit to the unstable state once and return. This monostable version will be referred to as a "single-shot circuit" which will distinguish it from an earlier used term "flip-flop" and because it is shorter than the term "self-restoring flip-flop circuit" later used in an attempt to more clearly distinguish from the term "unistable flip-flop circuit" employed even later. "Bistable reciproconductive circuits" are divided into the "binary reciproconductive circuit" which has a single input terminal to which triggering pulses are applied to alternate the state of conduction each time a pulse is applied. Such a circuit will be referred to hereinafter as a "binary flip-flop." The "bistable reciproconductive circuit" having two input terminals between which successive triggering pulses must be alternately applied to switch from one stable state to the other has been called both a "flip-flop" and a "lock-over circuit." This version hereinafter will be referred to as a "bilateral flip-flop circuit." Another so-called "trigger circuit" is one of several types frequently rather loosely referred to in the vernacular as a "Schmitt trigger." It differs from the previously mentioned circuits in that it responds primarily to changes in level and restores to the initial state when the pulse level drops. This type of circuit will be referred to as a "level-triggering flip-flop circuit" or as a "level-triggering circuit." Such level-triggering flip-flop circuits are excellent for resolving the output of photoelectric devices in binary fashion. When the light output level is sufficient to be recognized the level-triggering flip-flop will switch to a state so indicating. These circuits exhibit an "hysteresis characteristic" which is an advantage in more clearly distinguishing light and dark; only the level of light definitely desired for recognition will switch the circuit designed for the applications and hold it until the level has dropped well below the triggering level. The initial capability of the photoresponsive devices 50 and 52 are insured by similarly applying the appropriate outputs of level-triggering flip-flop circuits 74 and 76 to the AND gating circuit 68. These latter level-triggering circuits respond to input levels from the corresponding photoresponsive devices 50' and 52', preferably as boosted by amplifiers 77 and 78. When the circuit is operating as part of an overall computing and/or data-processing system, the availability of that system for operation should be reflected in the operation of the AND gating circuit 68. The voltage level at computer ready terminals 80 will set a bilateral flip-flop circuit 82 whose set level output is applied to the AND gating circuit 68. A flip-flop circuit 84 is in the preset condition through operation of another bilateral flip-flop circuit 88. The latter flip-flop circuit and a number of others are initially reset by computer command or by operation of a clear button switch applying a level at reset terminals 90 leading to the bilateral flip-flop circuit 82. These conditions being satisfied, the AND gating circuit 68 sets another bilateral flip-flop circuit 84 turning on an amplifier 86 for energizing the mask drive 54'. The flip-flop circuit 84 remains set for the traverse time of the mask drive 54' so that fluctuating outputs from the light responsive level-triggering flip-flop circuits 70, 74 and 76 at the inputs of the AND gating circuit 68 will be ineffective with respect to the mask drive 54'. The operation of the flip-flop circuit 88 also resets a probe complete flip-flop circuit 92 supplying terminals 94 with a voltage level indicating to the computer that the probe operation is complete. The AND gating circuit 96 is normally enabled after a reset pulse is applied at the reset pulse terminals 90 through the operation of three bilateral flip-flop circuits 102, 104, and 106 through OR gating circuits 112, 114, and 116 respectively. The light level output of the level-triggering flip-flop circuit 70 is applied to the OR gating circuit 116 to insure reset of the flip-flop circuit 106 and initially maintain it in the reset condition until the light level has completely Likewise the photoresponsive device 52' through the light level output of the level triggering circuit 76 insures that the flip-flop circuit 104 is reset through the OR gating circuit 114 as the mask is passing between the light spot 22 and the photoresponsive device 52'. An AND gating circuit 120 is enabled only when the reset level is available at the flip-flop circuit 82, flip-flop 88 is up and the level-triggering circuit 74 is up. The latter circuit goes up and down as the bars 35–n of the masking element 30 intercept the light between the spot 20 and the photoresponsive device 50 for applying pulses to the counters. The AND gating circuit 120 enables three AND gating circuits 122, 124 and 126, the outputs of which are connected to an X-coordinate counter 132, a reference counter 134 and a Y-coordinate counter 136. Counts equal to the horizontal, Y-coordinate X, coordinate displacement of the probe position from the spots 20 and 22 are obtained at the output terminals 140 of the counter 132. These data may be read out in parallel as indicated or serially if desired; both types of readout are entirely conventional. A count proportional to the vertical distance above the bottom border line of the image-bearing area 16 can be obtained at output terminals 150 with a dual mask system previously mentioned. For such operation the light spot 22 is best located at the top of the border 17 and the complement of the vertical counter obtained in the associated computer.

The tolerance in the vertical direction of most projectors is not nearly as close as in the horizontal direction. For this reason it is preferable that the light spot 22 or aperture be located intermediately of the vertical dimension as shown in the drawing. The particular connection of the counters 134 and 136 shown is that of a preferred version which will be discussed hereinafter. Obviously a counter can be arranged to count pulses in the Y or vertical direction as the counter 132 counts pulses for the horizontal or X-direction. The AND gating circuit 122 is armed by the flip-flop 102 when the circuit is in the set condition. Pulses are applied to the X-counter 132 by operation of the level-triggering circuit 74 rising and falling in response to the bars 35–n intercepting the light between the spot 20 and the photoresponsive device 50 corresponding to the device 50'. The AND gating circuit 124 is enabled by the flip-flop circuit 104 responding to a dark level of the horizontal-vertical (H-V) operation of the mask portion 34 interrupting the light between the spot 22 and the photoresponsive device 52'. This allows pulses to be fed to the counters 134 and 136 as determined by the responses of the photo devices. As light is blocked from the photoresponsive device 52' the horizontal coordinate counter 132 was enabled, as previously described, and at the same time the vertical reference counter 134 is enabled through the AND gating circuit 124. When the photosensitive device 60 in the probe corresponding to the device 60' is blocked by the action of the mask 34 the flip-flop circuit 106 is set and pulses are now applied to the Y-counter 136. When light is restored to both photo devices 52' and 60' the correspondence counters are disabled. The completion of this action disables the AND gating circuit 96 and resets the flip-flop circuit 88 to bring up the flip-flop circuit 92 indicating probe action complete on terminals 94 and to reset the flip-flop circuit 84 to reverse the masked drive 54' and return the masking element 30 to the initial position.

Figure 4:
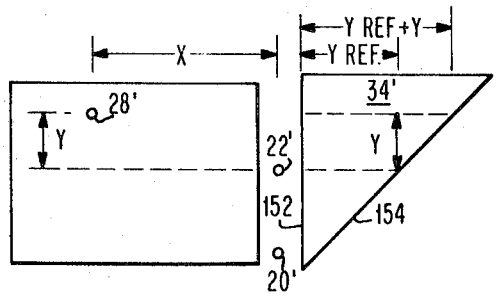
FIG. 4 illustrated a feature of the preferred embodiment of the invention as illustrated in FIG. 3.

Referring to FIG. 4 the operation of the preferred embodiment of the invention using a reference counter 134 and a vertical or Y-coordinate counter 136 becomes readily apparent by examining the switching portion 34' of the masking element 30 as it passes over the image-bearing area 16' covering the light sports 20' and 22' and the area 28' with respect to which the coordinates are desired. In preparation of the image frame according to the invention the mechanism for making the spots 20' and 22' (or for punching apertures in a slide mounting) is fixed so that there is virtually no deviation in distance and alignment. In placing the image-bearing portion 16' in the mechanism there may be a very small deviation in the placement. This deviation ordinarily will be less than the width of one counting bar (35–n) so that the normal tolerance in either the horizontal vertical direction is readily accommodated. As the vertical edge 152 of the masked portion 34' travels from the spot 22' to the spot 28', a single X-coordinate counter will determine the distance traveled in pulses generated by the bars 35–n interrupting the light from the spot 20'. Since the light interruption at the spot 22' and at the spot 28' is effected by the leading edge 152 a single counter can count the pulses for horizontal travel and the tolerance is such that it is accommodated in the dimensions of the generating bars 35–n. The vertical dimension or the Y-coordinate is determined, if desired, by a similar masking element moving in the vertical direction after the first mask has been moved and the count stored as previously described. In such an arrangement the lead generating bar can be arranged to start the counter and latch the gate until the leading edge of the mask element flanks the probe device so that only one light spot is necessary for both reference and count generation for both marks. It is far less difficult and less expensive to use two spots and a single mask. The vertical or Y-coordinate is then determined by the proper gating of the pulses corresponding to the number of bars interrupting the light from the time that the vertical edge 152 of the mask element intercepts the light to the probe 28' and the light is restored on the passage of the traveling diagonal edge 154. If the mask element 34' remains in the same axis at all times with respect to the image-bearing area 16', the same tolerance is effective as for the horizontal direction for all intents and purposes. However, in practice the projector has much looser tolerances in positioning film (or a slide) in the vertical direction than in the horizontal so that there will be a much greater difference in the measurement from the leading edge 152 to the diagonal edge 154. In the preferred embodiment of the invention a logic circuit is arranged with a reference counter 134 and a coordinate data counter 136 as shown and the Y-coordinate is determined to be above or below the reference spot 22. As the leading edge 152 interrupts light from the photoresponsive device 52' the Y-reference counter 134 is enabled and the Y-counter 136 is enabled as the leading edge 152 intercepts light from the probe photosensitive device 60'. The trailing edge 154 restoring light on the device 52' turns off the Y-reference counter 134 and the Y-counter 136 is turned off when the trailing edge 154 restores light to the probe device 60'. The count generated in the Y-reference counter 134 is subtracted from the count in the Y-counter 136 whereby the Y-coordinate is determined with the same tolerance as is the X-coordinate. This is done so that the count in the Y-counter before subtraction is the count of the width of the mask on the line of travel normal to the reference 22 and the count in the reference counter is the width of the mask on the line of travel to the probe. The angle and/or configuration of the diagonal trailing edge 154, is such that difference between the two counts is a measure of the distance from the reference line of the mask element to the line of the probe interception; the algebraic sign must be taken into account and it can be used with appropriate conversion in the associated computing device later, if desired. Now should the mask element shift up or down the same error is generated in the two counts; subtracting the counts cancels the error.

The numbers in the counters 132 and 136 are read out in parallel on the bus leading to the terminals 140 and 150 or serially by means (not shown) in the associated system which are entirely conventional. Conversion of these numbers to polar coordinates, if so desired, is accomplished by conventional conversion circuitry for that purpose in the associated information handling system.

While the invention has been described in terms of a preferred embodiment, it should be clearly understood that those skilled in the art will make changes in form and material without departing from the spirit and scope of the invention as defined hereinafter.

The invention claimed is:

1. An optical image frame coordinate data determining system, comprising
    at least one image frame of optical imaging material having an information-bearing image area and at least one light contrasting spot in a predetermined location with respect to said information-bearing image area,
    a display screen of transparent material,
    a projector for displaying the image of said frame on one side of said screen for viewing from the other side,
    at least one photosensitive device positioned adjacent said screen for individually sensing light projected from said spot,
    a probe having a photoresponsive element for detecting light on said screen at a point on said other side of said screen where said probe is placed,
    a mask mounted for movement across the optical path between said image frame and said photosensitive device and said screen to interrupt the light impinging on said photosensitive device and on said photoresponsive element and having a configuration for generating electric outputs therefrom for providing an indication of an ordinate of said point with respect to said light-contrasting spot.

2. An optical image frame coordinate data system as defined in claim 1 and wherein
    said image frame has an auxiliary image area adjacent said information-bearing area, and
    said light-contrasting spot is located within said auxiliary area.

3. An optical image frame coordinate data system comprising,
    at least one image frame of optical imaging material having at least two light spots in an auxiliary image area in predetermined locations with respect to an information-bearing image area,
    a display screen of transparent material,
    a projector for displaying the image of said frame on one side of said screen for viewing from the other side,
    a pair of photosensitive devices positioned adjacent said screen for individually sensing light projected from said spots,
    a probe having a photoresponsive element for detecting light on said screen at a point on the other side of said screen where said probe is placed,
    a mask element mounted for movement across the optical path between said image frame and the photosensitive devices and said screen for interrupting the light impinging on said photosensitive devices and said photosensitive element and having a configuration for generating electric outputs therefrom for providing an indication of the coordinate of said point with respect to said light spots.

4. An optical image frame coordinate data system as defined in claim 3 and wherein
    said mask element has a configuration whereby timing pulses are generated by movement of said mask element with respect to one of said spots.

5. An optical image frame coordinate data system as defined in claim 3 and wherein
    said mask element has a portion comprising alternating transparent and opaque parallel bars.

6. An optical image frame coordinate data system as defined in claim 2 and wherein
    said mask is moved between said display screen and said image frame.

7. An optical image frame coordinate data system as defined in claim 5 and incorporating
    counting circuitry actuated in response to said parallel bars interrupting light from the corresponding photosensitive device.

8. An optical image frame coordinate data system as defined in claim 7 and wherein
    said mask is generally triangular in shape and is moved substantially uniformly across said optical path.

9. An optical image frame coordinate data system as defined in claim 7 and wherein
    said counting circuitry comprises at least two counters, and logical circuitry coupled to said photosensitive devices and said photoresponsive element and said counter for directly producing Cartesian coordinates.

10. An optical image frame coordinate data system as defined in claim 9 and incorporating
    a third counter, and
    said logical circuitry is arranged for determining one coordinate from the algebraic difference between the counts in two of said counters.